May 2, 1939.                F. K. McCUNE                2,156,734
PHOTOMETER
Filed July 14, 1936
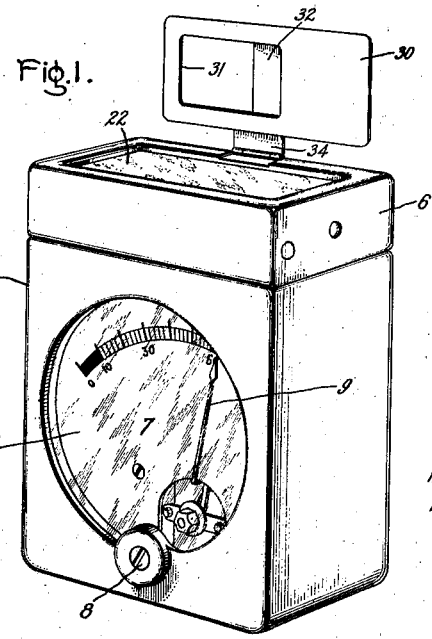
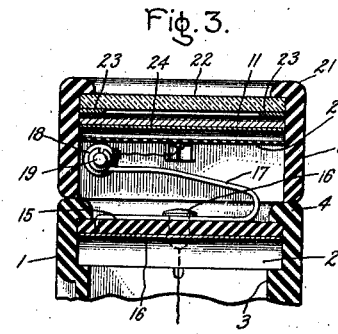
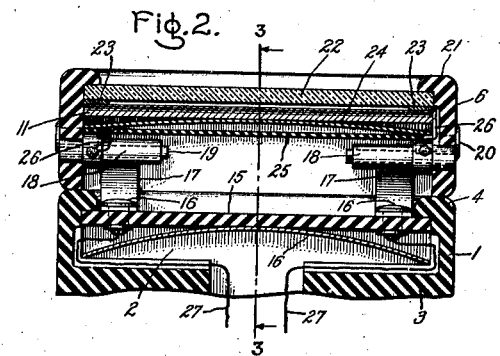
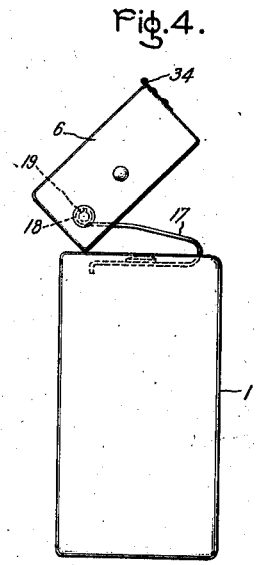
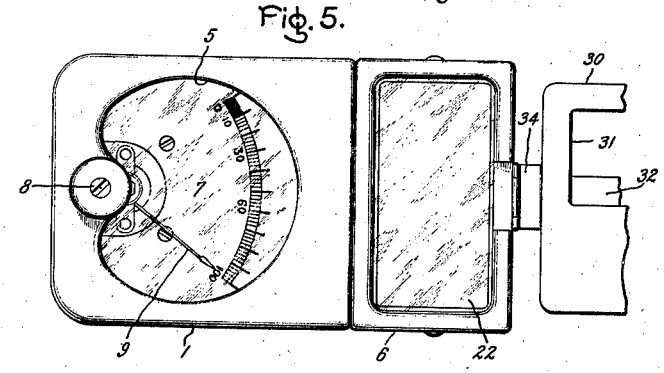
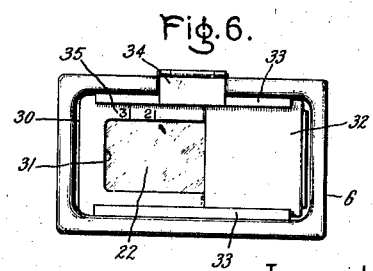
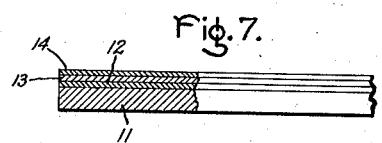
Inventor:
Francis K. McCune,
by Harry E. Dunham
His Attorney.

Patented May 2, 1939

2,156,734

UNITED STATES PATENT OFFICE 2,156,734

PHOTOMETER

Francis K. McCune, Swampscott, Mass., assignor to General Electric Company, a corporation of New York Application July 14, 1936, Serial No. 90,557

2 Claims. (Cl. 88—23)

The present invention relates to photometers or [devices] for measuring light, more particularly to those photometers which employ a light-sensitive unit of the type which generates an electromotive force when exposed to light.

An object of the present invention is to provide a photometer which offers the maximum utility, not only from the standpoint of measuring light coming from many directions, but also from the standpoint of greater accuracy in aligning the light-sensitive surface with respect to a particular direction of light. In carrying out this object, I provide a photometer in which the light-sensitive member may be moved with respect to the electrical measuring instrument to automatically assume a position in rectilinear alignment with the instrument for measuring light coming from the direction in which the instrument is read, and also may be moved to a new position in which the member is exactly normal to the instrument for measuring light coming from the normal direction.

Another object of the invention is to provide a photometer in which the range of light intensity over which the device will accurately respond for measurement is increased. In carrying out this object, I provide the photometer with an accessory which, when it is necessary to use in case of light of high intensities, will reduce the amount of light reaching the light-sensitive surface by a predetermined and proportionate factor. The ratio of reduction may be changed by suitable adjustment of the accessory to accommodate light intensities of various orders of magnitude. Other objects and features will be apparent as the following specification is perused in connection with the accompanying drawing, in which Fig. 1 is a view in perspective of the improved photometer in its completely assembled form; Fig. 2 is a fragmentary cross-sectional view of the device showing an improved snap-action spring and hinge arrangement between the meter and cell casings; Fig. 3 is a cross-section taken along line 3—3 of Fig. 2; Fig. 4 is an elevational view of the complete photometer showing the operation of the improved hinge arrangement between the casings; Fig. 5 is a plan view of the photometer showing the relative arrangement of the cell and the "multiplying device" so-called, in its open position. Fig. 6 illustrates certain details of the multiplying device; Fig. 7 is a cross-sectional view taken through the cell.

In the drawing, numeral 1 designates a box-like casing of rectangular configuration, having a flat top and bottom and preferably made of a phenolic condensation product. As shown in Figs. 2 and 3, the casing is hollow and is provided at one end, the upper as shown in these figures, with a rectangular compartment indicated at 2. The compartment is partitioned off from the remainder or main portion of the casing by a wall or shelf 3. The compartment is provided with an inwardly extending lip or flange 4, the purpose of which will be explained presently. The front part of the casing, as shown in Fig. 1, is provided with an opening 5 of any suitable shape, for example, circular as illustrated, and the back of the casing (not shown) is entirely open at the time the casing is molded. There are thus three openings in the casing, the front opening 5, the top rectangular opening surrounded by the lip 4, and the entire back of the casing. A casing of this sort may be readily molded on machines of standard design; in fact, those machines which are employed to mold the casings of voltmeters and ammeters may be readily modified to mold the casing 1.

Within the main part of the casing 1, there is a microammeter indicated broadly by the reference character 7, of any suitable and well-known design, the scale face of the meter bearing a scale which may be marked in foot-candles or other form of light indicia. No further description of the meter is necessary other than to state that if desired, the meter may be provided with a zero-correction mechanism 8 of any suitable and well-known type. In response to a voltage impressed across the terminals of the meter, the indicating needle 9 traverses the scale face and comes to rest at a position which indicates a certain number of foot-candles in terms of the current flowing through the meter.

For operating the meter, a light-sensitive device of any suitable current-generating type is employed and preferably the type which has been described and claimed in the copending application of Clarence W. Hewlett, Serial No. 716,677, filed March 21, 1934, and entitled "Photoelectric cell and manufacturing processes therefor". Such a cell has been illustrated in Figs. 2 and 3 as being contained within a second box-like casing 6, and is shown apart from the casing in Fig. 7. The casing 6 may be fabricated out of similar material and in the same manner as the casing 1, described hereinbefore. As stated in the Hewlett application referred to, the cell consists essentially of a plate 11 (see Fig. 7) of rectangular configuration and fabricated of a base metal such as iron or nickel. The plate is first ground off to make it smooth and clean, and then sandblasted, in order to give the light-sensitive material 12 a good grip on the surface. This work is of course done before the plate is assembled in the casing. The plate may then be mounted in any standard form of vacuum chamber and the selenium layer 12 evaporated in a high vacuum and condensed on the sandblasted iron surface. The plate is then heated slightly above the melting point of selenium and the evaporated layer melted. If desired, the selenium may be spread on the plate and then melted. The plate is then quickly cooled and placed in an oven at a temperature of approximately 185° C. and held at this temperature for a period of 24 to 72 hours, the exact time of which can be determined by experiment and depends to some extent upon the initial quality of the selenium employed.

The selenium-covered iron plate is thereafter placed in an evacuated chamber, preferably containing argon at a pressure of about 200 microns, and a thin film 13 of a metal belonging to the second group of elements appearing in the Mendelejeff Periodic Table, such as cadmium, sputtered onto the selenium, employing a sputtering current of 10-100 milliamperes. The sputtering effect is preferably carried out in short flashes so as to avoid heating the selenium surface unduly. During the sputtering process, a flask of liquid air is arranged to cool the sputtering chamber so that any condensible vapors may be immediately removed from the discharge.

After the layer of cadmium or similar metal has been deposited on the selenium, the plate may then be removed from the chamber and laid aside in the air to age until the current sensitivity of the coated plate comes down to practically zero, at which time the electromotive force generated by the impingement of ambient light on the cell increases rapidly. The aging step is terminated when the electromotive force reaches a maximum.

The cadmium-selenium-coated plate may then be placed in the chamber containing argon and a film 14 of platinum or other non-oxidizable metal sputtered on top of the cadmium, this film of platinum being exceedingly thin and just barely visible on the surface.

After the meter 7 has been secured to the casing 1, a side plate 15 is mounted in the compartment 2 and held against the inner surface of the lip 4 by an arcuate spring member 16 which bears against the inner surface of the side plate and the upper surface of the wall or shelf 3. A back cover (not shown) is then secured to the casing 1 and to the contained meter so that the latter is completely enclosed within the casing except for the opening 5. A glass plate may be provided over this opening to protect the scale face of the meter. The side plate 15 and the back plate or cover may be fabricated of a material similar to that of the casing, i. e., a phenolic condensation product.

The side plate 15 carries a pair of rivets 16 which secure two U-shaped leaf springs 17 to the casing 1. The ends of the leaf springs opposite from the rivets terminate in hinges 18 which rotate on a pintle or rod 19. These rods extend into and are secured to the casing 6, as shown more clearly in Fig. 2. The leaf springs are normally held in tension, and their action is such that when the casing 6 is rotated on the axis of the rods 19, the inner edge of the casing is held in continual contact with the upper edge of the casing 1 and the said inner edge simply slides along the side surface of the casing 1. The force exerted by the springs 17 is not only sufficient to urge the casing 6 into contact with the larger casing 1 at all times while it is being moved or rotated, thereby maintaining a rigid and rotatable connection between the casings, but also tends to hold the casing 6 in a first stable position with its bottom surface in abutment with the upper side of the casing 1 before the casing is moved, as indicated more clearly in Fig. 1. Moreover, after the casing 6 is moved or rotated to its extreme outer position, i. e., to a vertical position in Fig. 4, the springs cause the casing and the contained light-sensitive cell to assume a second stable position in substantial rectilinear alignment with the front face of the casing 1. These springs also hold the casing 6 rigidly in any intermediate position in its arcuate travel because as stated hereinbefore, the springs continually urge at least one edge of the casing 6 into contact with the upper or side surface of the casing 1.

It has been pointed out that the casing 6 contains the light-sensitive unit or photo-electric cell. As in the case of the casing 1, the casing 6 is also provided with a lip or flange 21 against which bears a glass member 22. Between the plate 22 and the light-sensitive unit which consists of the elements 11, 12, 13 and 14, but which is designated generically in Figs. 2 and 3 by the reference character 11, there are some tin foil strips 23 which serve as contact or terminal members for the platinum layer 14. The light-sensitive device is forced against the strips 23 of tin foil or other conducting material which, in turn, press against the glass plate 22 and the lip 21 by an arcuate spring 24, similar to the spring employed in the casing 1. The upper surface of the spring 24 bears against the lower surface of the iron plate 11, and the ends of the spring rest on a heavy base plate 25 which extends across the casing 6 and is rigidly secured thereto in any suitable manner, for example, by means of rivets 20 which extend through the sides of the casing.

In placing the light-sensitive member in position, it has been found that the most practical way is to assemble the coated plate 11, the pieces of tin foil 23, the glass plate 22, and the spring 24 together and while forcing the glass plate against the inner surface of the lip 21, even to the extent of flattening the spring 24, apply the rivets to the base plate 25 which will then hold the entire assembly in place.

An electrical connection 26 may be taken from one of the tin foil pieces 23 to one of the hinge members 18 and another connection taken from the leaf spring 24 which is in contact with the iron plate 11 to the other hinge member 18. As stated hereinbefore, these hinge members are in contact through each spring member 17 with the rivets 16 so that electrical connections 27 may be made between each of the rivets and the corresponding terminal on the microammeter 7.

It is therefore apparent that in the improved photometer, the electrical measuring device is contained in the casing 1, and the light-sensitive device of an improved sort is contained in the casing 6, and these casings are so connected through the improved snap-action spring and hinge arrangement 17, 18 that the light-sensitive element can be moved relatively to the electrical measuring instrument and can take up any number of positions, including the position which is exactly normal to the plane of the microammeter and a position which is exactly in the same plane as the electrical measuring instrument. During any and all of these movements of the casing 6 about the casing 1, the snap-action spring and hinge arrangement serves not only to force the casing 6 into positions in which the light-sensitive device will receive light from definite and specified directions, but will also serve as electrical conductors for the current generated by the light-sensitive device and which is transmitted to the microammeter for measurement.

In order to increase the range of light response, as for example when the device is employed for measuring daylight of relatively low intensity on the one hand and certain forms of highly intense artificial light on the other hand, such as arc light, I may provide the photometer with a so-called "multiplying device" of an improved type. As shown more clearly in Figs. 1, 5 and 6, this multiplying device may take the form of a rectangular sheet of metal or a diaphragm 30 of a shape and size as closely to overlie the glass member 22 and snugly to fit within the lipped portion 21 of the casing 6. This sheet of metal has a rectangular opening 31 extending approximately one-half of its length. A thin sheet of metal 32 is mounted in grooves 33 which may be formed along the two side edges of the member 30, thereby permitting the member 32 to slide over the metal plate 30, entirely to close the opening 31 if desired, or to close any proportionate part of the opening, as indicated more clearly in Fig. 6. The metal plate 30 is attached to the casing 6 by means of a hinge 34 which permits the plate member to swing clear of the casing, and hence, entirely clear of the light-sensitive member which is positioned under the glass plate 22. In the position shown in Figs. 1 and 5, the plate member 30 is swung away from the casing 6, permitting light to fall over the entire area of the glass plate 22. However, in Fig. 6, the metal plate or multiplier is swung to its closed position but with the slidable member 32 moved as far as possible to the right (as shown), leaving exposed only one-half or slightly less of the glass plate 22. It will be understood that the slidable member 32 may be moved to the left to take up various positions, as indicated by the marks or other indicia 35 on the underlying metal plate, and as stated hereinbefore, if desired, the slide 32 can be moved sufficiently far to the left completely to close the opening.

In case the improved photometer is employed for measuring daylight or other diffused light, the member 30 is ordinarily swung away from the glass plate 22 into the position shown in Figs. 1 and 5 so as to expose the entire area of the glass plate 22 and the photo-electric cell which underlies the glass plate. As stated in the Hewlett application, when light reaches the photo-electric cell, electromotive force is generated which, in turn, causes current to flow through the conductors 26 through the hinges 18 and the springs 17 to the microammeter 7. Inasmuch as the electromotive force generated in this manner is in direct proportion to the intensity of light which activates the photo-electric cell, the microammeter may be calibrated in terms of foot-candles so as to indicate directly the intensity of light actually reaching the photo-electric cell and with the multiplying device in a predetermined position. If the photometer with the member 30 in the open position were to be used for measuring light of exceedingly high intensity, for example, arc light or brilliant sunlight, it might be found that the electromotive force generated would be so high as to cause the needle 9 to swing off scale. It is therefore necessary to cut down or reduce the light flux in a known proportion or factor and make the necessary calculations or adjustments based on the actual reading of the microammeter, to account or compensate for the proportion which the light had been reduced or intercepted. Thus, if the light flux were reduced approximately one-half, as would be the case when the metal member 30 is swung to its closed position, i. e. overlying the glass plate 22, but with the slide 32 in its extreme right-hand position as shown in Fig. 6, thus exposing approximately one-half of the light-sensitive area to the light, the measurement obtained by the microammeter should be multiplied by a factor which may be determined as the result of calibration. In this case, the multiplying factor would be approximately two, depending on the exact proportion which the light had been reduced. In the case of extremely high intensity, the slide 32 would be moved to the left so as to expose less of the opening 31 to the light rays, and a correspondingly larger multiplying factor would be applied to translate the reading of the microammeter into the proper foot-candles. Thus, the member 30 and the adjustable slide 32 may be termed a "multiplying device", since its use introduces the necessity for multiplying the actual readings of the microammeter by a certain factor, depending upon the position of the slide 32. By hinging the multiplying device to one of the casings of the photometer, the device is always in the proper position to be used almost instantly, and the member cannot be lost. These last considerations are quite important because in actual use, the photometer may be called upon to measure, first, a light of very low intensity and almost immediately thereafter to measure a light of unusually high intensity. Unless the multiplier were handy and ready for use, it is possible that under the conditions of high light intensity, the light-sensitive surface of the photo-electric cell may become permanently damaged. It is also apparent that the use of the multiplier 30 extends considerably the range of light intensities within which the photometer will measure quite accurately when the proper multiplying factor is applied.

While I have described the member 22 as constituting a glass plate of ordinary clear glass, if desired, a filter may be included, either by physical incorporation in the glass itself or as a separate element for determining the quality of light which is permitted to reach the light-sensitive surface. It is well known of course that the various lights have predominant colors in various parts of the spectrum and since the photo-electric cell may have a certain visibility characteristic which does not match that of the light to be measured, it is necessary to have the color characteristic of the light conform more closely to the visibility characteristic of the cell by a filter of proper design. Since filters of this type are well known in the art, no further explanation is believed to be necessary.

What I claim as new and desire to secure by Letters Patent of the United States is:

1. A photometer comprising two casings, a photo-electric cell of flat rectangular configuration in one of said casings, and an electrical measuring instrument of flat rectangular configuration in the other casing, said cell and instrument being electrically connected together, an opaque member of rectangular configuration hinged to the casing which contains the cell, said member covering the light-sensitive surface and having a variable opening to expose variable areas of said surface to light, said member being adapted to move on the hinge toward and away from the light-sensitive surface whereby different areas of said surface from said variable areas are exposed to light, and means including a hinge whereby one of the casings and the contained photo-electric cell are adapted to move about the other casing.

2. A photometer comprising a first boxlike casing having at least one flat side, a second boxlike casing separate from the first and having a light transmitting window on one side thereof and two plane surfaces of substantial area on the sides thereof which are respectively parallel to and perpendicular to the window, a current measuring device in the first casing, a photoelectric cell in the second casing and disposed in light receiving relation to said window, electrical connections between said cell and said current measuring device, and spring means yieldingly constraining the second casing into contact with the said flat side of the first casing, said spring means permitting rotation of the second casing from a first stable position in which one of its said plane surfaces is in abutting contact with the said flat side of the first casing to a second stable position in which the other of its said plane surfaces is in abutting contact with the same casing side.

FRANCIS K. McCUNE.